(12) United States Patent
Woodward et al.

(10) Patent No.: US 10,573,153 B1
(45) Date of Patent: Feb. 25, 2020

(54) DEPENDENT LOCATION-MONITORING BRACELET

(71) Applicants: Michelle Woodward, San Antonio, TX (US); Aaron Woodward, San Antonio, TX (US)

(72) Inventors: Michelle Woodward, San Antonio, TX (US); Aaron Woodward, San Antonio, TX (US)

( * ) Notice: Subject to any disclaimer, the term of this patent is extended or adjusted under 35 U.S.C. 154(b) by 0 days.

(21) Appl. No.: 16/242,172

(22) Filed: Jan. 8, 2019

(51) Int. Cl.
*G08B 21/02* (2006.01)
*G06K 9/00* (2006.01)

(52) U.S. Cl.
CPC ..... *G08B 21/0269* (2013.01); *G06K 9/00013* (2013.01); *G08B 21/028* (2013.01); *G08B 21/0288* (2013.01)

(58) Field of Classification Search
CPC ............ G08B 21/0269; G08B 21/0288; G06K 9/00013
USPC .................................................... 340/539.13
See application file for complete search history.

(56) References Cited

U.S. PATENT DOCUMENTS

| | | | |
|---|---|---|---|
| 6,169,494 B1 | 1/2001 | Lopes | |
| 6,265,974 B1 * | 7/2001 | D'Angelo | G08B 13/1409 340/328 |
| 6,278,370 B1 | 8/2001 | Underwood | |
| 6,563,427 B2 * | 5/2003 | Bero | G08B 21/0227 340/539.11 |
| 7,015,817 B2 | 3/2006 | Copley | |
| D571,249 S | 6/2008 | Frederick | |
| 7,602,303 B2 | 10/2009 | Douglas | |
| 9,129,503 B2 | 9/2015 | Borlenghi | |
| 9,865,149 B1 * | 1/2018 | Pence | G08B 21/0288 |
| 10,037,667 B2 * | 7/2018 | Desoyza | A61B 5/747 |
| 2004/0198382 A1 | 10/2004 | Wong | |
| 2005/0020274 A1 | 1/2005 | Ursini | |

FOREIGN PATENT DOCUMENTS

WO          2005069033          9/2005

* cited by examiner

*Primary Examiner* — John A Tweel, Jr.
(74) *Attorney, Agent, or Firm* — Kyle A. Fletcher, Esq.

(57) ABSTRACT

The dependent location-monitoring bracelet is a jewelry item. The dependent location-monitoring bracelet is configured for use with a client. The dependent location-monitoring bracelet is worn on the wrist of a client. The dependent location-monitoring bracelet is configured for use with an appropriate authority. The dependent location-monitoring bracelet is biometrically attached to the client such that the dependent location-monitoring bracelet can only be removed from the client by the appropriate authority. The dependent location-monitoring bracelet comprises the jewelry item and an alarm circuit. The jewelry item contains the alarm circuit. The alarm circuit communicates the location of the client using SMS messages transmitted over a wireless communication link and through a commercially provided and publicly available cellular wireless network.

19 Claims, 4 Drawing Sheets

DEPENDENT LOCATION-MONITORING BRACELET

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of signaling and instruments including alarms for ensuring the safety of a person, more specifically, a transmitting and receiving system carried by a parent and a child wherein the exact location of the child is determined using a navigation satellite system. (G08B21/0269)

SUMMARY OF INVENTION

The dependent location-monitoring bracelet is a jewelry item. The dependent location-monitoring bracelet is configured for use with a client. The dependent location-monitoring bracelet is worn on the wrist of a client. The dependent location-monitoring bracelet is configured for use with an appropriate authority. The dependent location-monitoring bracelet is biometrically attached to the client such that the dependent location-monitoring bracelet can only be removed from the client by the appropriate authority. The dependent location-monitoring bracelet comprises the jewelry item and an alarm circuit. The jewelry item contains the alarm circuit. The alarm circuit communicates the location of the client using SMS messages transmitted over a wireless communication link and through a commercially provided and publicly available cellular wireless network.

These together with additional objects, features and advantages of the dependent location-monitoring bracelet will be readily apparent to those of ordinary skill in the art upon reading the following detailed description of the presently preferred, but nonetheless illustrative, embodiments when taken in conjunction with the accompanying drawings.

In this respect, before explaining the current embodiments of the dependent location-monitoring bracelet in detail, it is to be understood that the dependent location-monitoring bracelet is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the dependent location-monitoring bracelet.

It is therefore important that the claims be regarded as including such equivalent construction insofar as they do not depart from the spirit and scope of the dependent location-monitoring bracelet. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
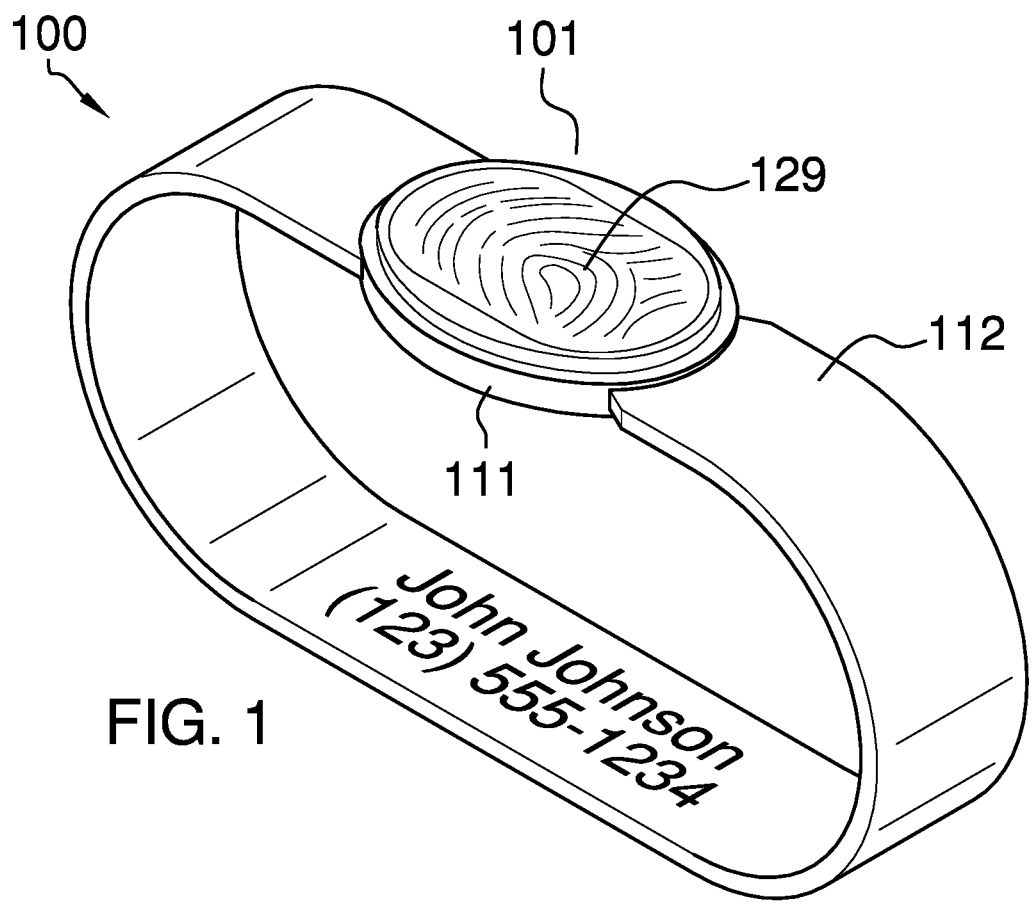
FIG. 1 is a perspective view of an embodiment of the disclosure.
Figure 2:
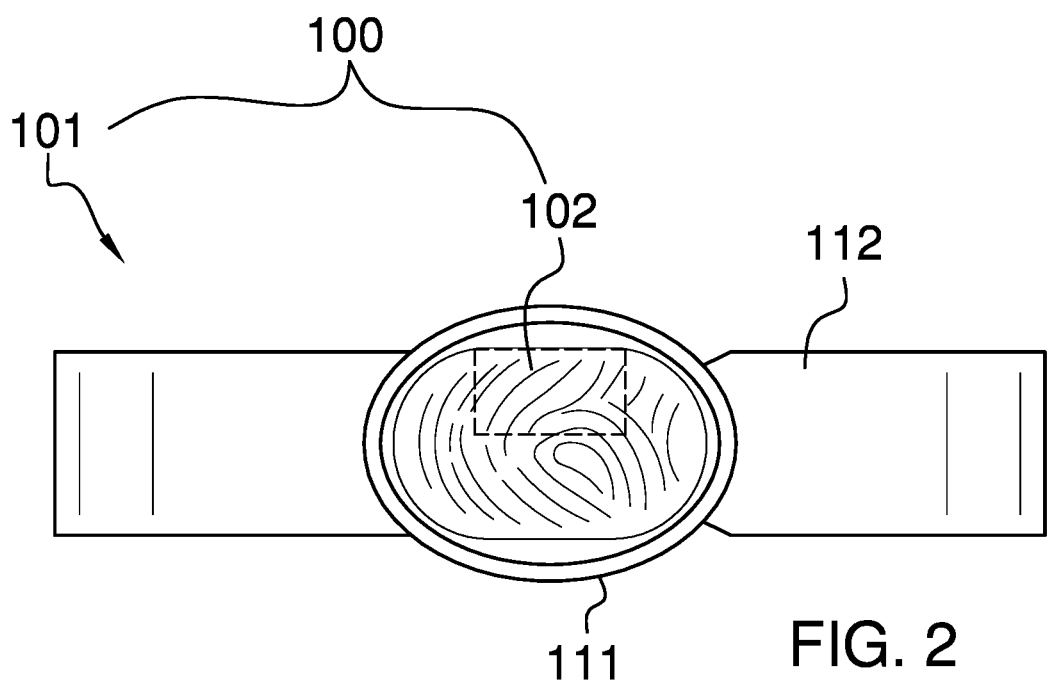
FIG. 2 is a top view of an embodiment of the disclosure.
Figure 3:
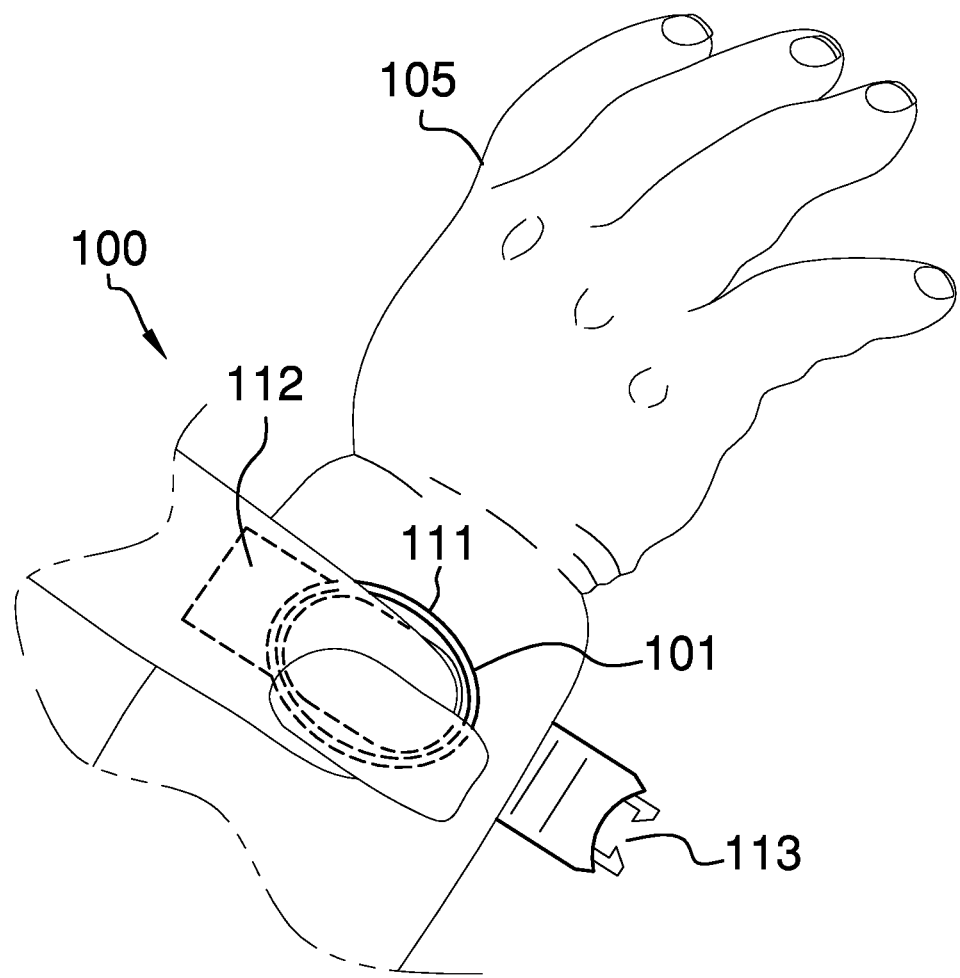
FIG. 3 is an in-use view of an embodiment of the disclosure.
Figure 4:
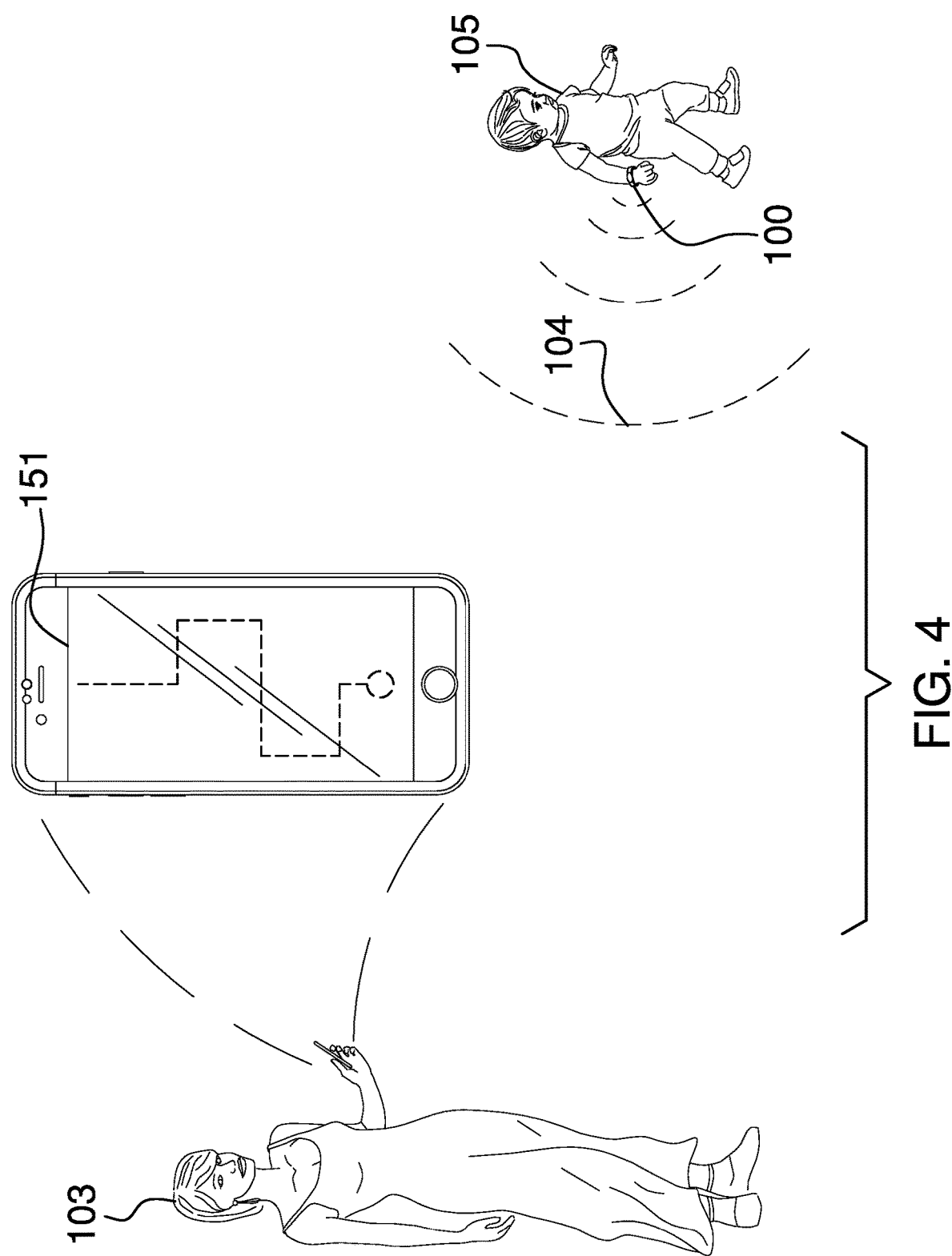
FIG. 4 is an in-use view of an embodiment of the disclosure.
Figure 5:
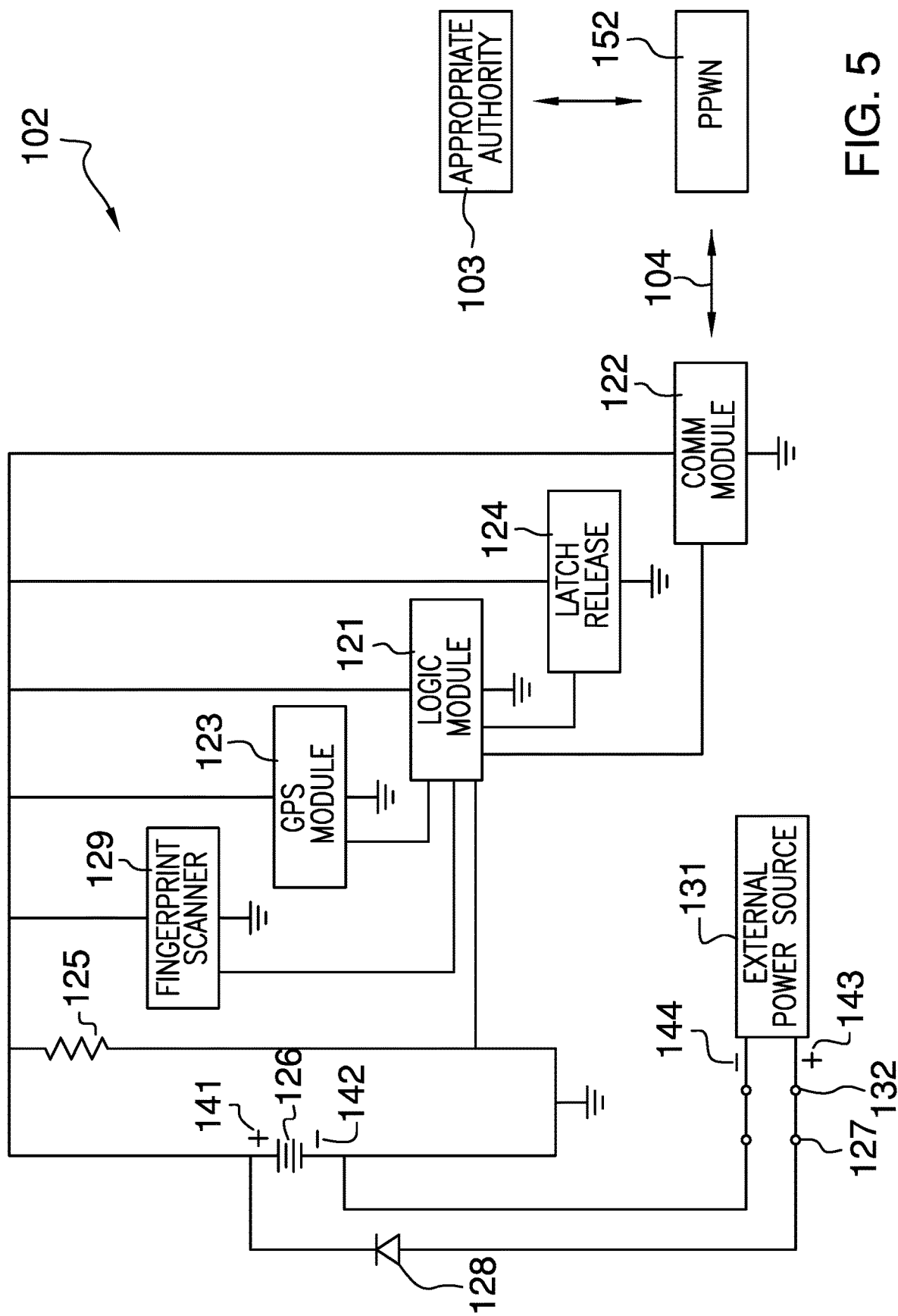
FIG. 5 is a block diagram of an embodiment of the disclosure.

Detailed reference will now be made to one or more potential embodiments of the disclosure, which are illustrated in FIGS. 1 through 5.

The dependent location-monitoring bracelet 100 (hereinafter invention) is a jewelry item 101. The invention 100 is configured for use with a client 105. The invention 100 is worn on the wrist of a client 105. The invention 100 is configured for use with an appropriate authority 103. The invention 100 is biometrically attached to the client 105 such that the invention 100 can only be removed from the client 105 by the appropriate authority 103. The invention 100 comprises the jewelry item 101 and an alarm circuit 102. The jewelry item 101 contains the alarm circuit 102. The alarm circuit 102 communicates the location of the client 105 using SMS messages transmitted over a wireless communication link 104 and through a commercially provided and publicly available cellular wireless network 152.

The appropriate authority 103 further comprises a personal data device 151. The personal data device 151 further comprises a commercially provided and publicly available cellular wireless network 152. The personal data device 151 is a programmable electrical device that communicates with the alarm circuit 102 through the commercially provided and publicly available cellular wireless network 152. The personal data device 151 provides data management and communication services to the appropriate authority 103. The personal data device 151 through one or more functions is referred to as an application. The application is a set of logical operating instructions that are performed by the personal data device 151. The addition of an application will provide increased functionality for the personal data device 151. This disclosure assumes that an application already exists for the purpose of interacting with the alarm circuit 102. Methods to design and implement an application on a personal data device 151 are well known and documented in the electrical arts.

The client 105 is an individual designated to wear the jewelry item 101.

The jewelry item 101 is an item that is worn on the wrist of the client 105. The jewelry item 101 contains the alarm circuit 102. The jewelry item 101 attaches the alarm circuit 102 to the client 105. The jewelry item 101 comprises a housing 111, a wrist band 112, and a latching mechanism 113.

The housing 111 is a rigid structure. The housing 111 contains the alarm circuit 102. The housing 111 is formed with all apertures and form factors necessary to allow the housing 111 to accommodate the use and operation of the alarm circuit 102. Methods to form a housing 111 suitable for the purposes described in this disclosure are well-known and documented in the mechanical arts.

The wrist band 112 is a loop that attaches the housing 111 to the wrist of the client 105. The wrist band 112 is a flexible structure.

The latching mechanism 113 is a fastening device. The latching mechanism 113 secures the wrist band 112 to the wrist of the client 105. The latching mechanism 113 is an electrically controlled lock. The latching mechanism 113 is controlled by the alarm circuit 102.

The alarm circuit 102 is an electric circuit. The alarm circuit 102 communicates with the GPS such that the alarm circuit 102 determines the GPS coordinates of the client 105. The alarm circuit 102 monitors the jewelry item 101 such that the alarm circuit 102 will detect when the jewelry item 101 is cut off of the client 105.

The alarm circuit 102 communicates over the wireless communication link 104 with the commercially provided and publicly available cellular wireless network 152. The alarm circuit 102 transmits SMS messages over the commercially provided and publicly available cellular wireless network 152 to an appropriate authority 103. The appropriate authority 103 is an individual previously designated to receive SMS messages from the alarm circuit 102.

The alarm circuit 102 sends an SMS message to inform the appropriate authority 103 of the GPS coordinates of the client 105. The alarm circuit 102 sends an SMS message to inform the appropriate authority 103 when the jewelry item 101 has been cut off the client 105. The alarm circuit 102 biometrically confirms the identity of the appropriate authority 103 before enabling the removal of the jewelry item 101 from the wrist of the client 105.

The alarm circuit 102 implements biometric safeguards that ensure that only the appropriate authority 103 can authorize the release of the jewelry item 101 from the wrist of the client 105.

The alarm circuit 102 comprises a logic module 121, a communication module 122, a GPS module 123, a latch release 124, a charging port 127, a diode 128, a biometric sensor 129, and an external power source 131. The battery 126 further comprises a first positive terminal 141 and a first negative terminal 142. The external power source 131 further comprises a second positive terminal 143 and a second negative terminal 144. The external power source 131 further comprises a charging plug 132.

The logic module 121 is a readily and commercially available programmable electronic device that is used to manage, regulate, and operate the alarm circuit 102. Depending on the specific design and the selected components, the logic module 121 can be a separate component within the alarm circuit 102 or the functions of the logic module 121 can be incorporated into another component within the alarm circuit 102. The communication module 122 is a wireless electronic communication device. The communication module 122 is controlled by the logic module 121.

The communication module 122 communicates SMS and MMS messages between the logic module 121 and the appropriate authority 103 through a commercially provided and publicly available cellular wireless network 152. The use of a commercially provided and publicly available cellular wireless network 152 is preferred because: 1) of its low cost; 2) of the widespread availability and the broad interoperability between competing commercially provided and publicly available cellular wireless networks 152; and, 3) methods and techniques to send SMS and MMS messages over a commercially provided and publicly available cellular wireless network 152 are well known and documented by those skilled in the electrical arts.

The GPS module 123 is an electrical device that communicates with the GPS to determine the GPS coordinates of the GPS module 123. When queried by the logic module 121, the GPS module 123 transfers the GPS coordinates to the logic module 121.

The latch release 124 forms the electrical lock portion of the latching mechanism 113. The logic module 121 electrically controls the operation of the latch release 124. The logic module 121 sends a signal that releases the latch release 124 after the logic module 121 has biometrically confirmed the presence of the appropriate authority 103 using the biometric sensor 129.

The continuity sensor 125 is an electrical circuit. As shown most clearly in FIG. 5, the continuity sensor 125 comprises a pull-up resistor and an electrical conductor. The pull-up resistor limits the flow of electricity through the continuity sensor 125 to safe levels. The electric conductor of the continuity sensor 125 is positioned along the surface of the wrist band 112 such that the electric conductor is cut if the wrist band 112 is cut. The logic module 121 measures the voltage across the electric conductor along the length of the wrist band 112. If the logic module 121 detects a measurable voltage across the conductor, the logic module 121 sends an SMS message to the appropriate authority 103 indicating the security of the invention 100 is compromised.

The battery 126 is a commercially available rechargeable battery 126. The chemical energy stored within the rechargeable battery 126 is renewed and restored through use of the charging port 127. The charging port 127 is an electrical circuit that reverses the polarity of the rechargeable battery 126 and provides the energy necessary to reverse the chemical processes that the rechargeable battery 126 initially used to generate the electrical energy. This reversal of the chemical process creates a chemical potential energy that will later be used by the rechargeable battery 126 to generate electricity.

The charging port 127 attaches to an external power source 131 using a charging plug 132. The charging port 127 receives electrical energy from the external power source 131 through the charging plug 132. The diode 128 is an electrical device that allows current to flow in only one direction. The diode 128 installs between the rechargeable battery 126 and the charging port 127 such that electricity will not flow from the first positive terminal 141 of the rechargeable battery 126 into the second positive terminal 143 of the external power source 131. In the first potential embodiment of the disclosure, the external power source 131 and the charging port 127 are compatible with USB power requirements.

The biometric sensor 129 is a commercially available security device. The biometric sensor 129 is a sensor that scans the fingerprint of the appropriate authority 103 and codes the scan into an electrical signal. The biometric sensor 129 is an "all-in-one" device that: 1) registers the fingerprint of the appropriate authority 103; 2) stores the registered fingerprint of the appropriate authority 103; 3) scans a fingerprint during the process of releasing the latch release 124 of the latch mechanism 113; 4) compares the scanned fingerprint to the registered fingerprint of the appropriate authority 103; and, 5) upon a fingerprint match sends a signal to the logic module 121 verifying the fingerprint match. In the first potential embodiment of the disclosure, a commercially available fingerprint scanner similar to the ADH-Tech GT-511C3 fingerprint scanner is the biometric sensor 129.

The following definitions were used in this disclosure:

Appropriate Authority: As used in this disclosure, an appropriate authority is a previously determined person or organization that is designated to receive alarm or other notification messages regarding a monitored system or activity.

Band: As used in this disclosure, a band is a flat loop of material.

Battery: As used in this disclosure, a battery is a chemical device consisting of one or more cells, in which chemical energy is converted into electricity and used as a source of power. Batteries are commonly defined with a positive terminal and a negative terminal.

Biometric Device: As used in this disclosure, a biometric device is a security device that identifies an individual through the use of a unique and measurable physiological characteristic of the individual. Typical unique and measurable physiological characteristic include, but are not limited to, fingerprints, DNA, or retina of the eye.

Client: As used in this disclosure, a client is a person who is designated to receive service.

Commercially Provided And Publicly Available Cellular Wireless Network: As used in this disclosure, a commercially provided and publicly available cellular wireless network refers to subscription-based publically available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN.

Electronic Lock: As used in this disclosure, an electronic lock is an electromechanically operated lock that: 1) mechanically locks an object; and, 2) is secured and released using an electrical or electronically driven mechanism.

External Power Source: As used in this disclosure, an external power source is a source of the energy that is externally provided to enable the operation of the present disclosure. Examples of external power sources include, but are not limited to, electrical power sources and compressed air sources.

Form Factor: As used in this disclosure, the term form factor refers to the size and shape of an object.

Flexible: As used in this disclosure, flexible refers to an object or material that will deform when a force is applied to it but that will not necessarily return to its original shape when the deforming force is removed.

GPS: As used in this disclosure, and depending on the context, GPS refers to: 1) a system of navigational satellites that are used to determine the position and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System.

Housing: As used in this disclosure, a housing is a rigid casing that encloses and protects one or more devices.

Jewelry: As used in this disclosure, jewelry is a personal decorative item that is worn by a person. Examples of jewelry include, but are not limited to, necklaces, bracelets, rings, earrings, cufflinks, brooches, and wristwatches.

Latch: As used in this disclosure, a latch is a fastening or locking mechanism. The use of the term latch does not necessarily but often implies the insertion of an object into a notch or cavity.

Lock: As used in this disclosure, a lock is a fastening device that is released through the use of a key, a numeric or alphanumeric combination, or a biometric identification protocol.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

PDD: As used in this disclosure, PDD is an acronym for a personal data device.

Personal Data Device: As used in this disclosure, a personal data device is a handheld logical device that is used for managing personal information and communication. Examples of personal data device include, but are not limited to, cellular phones, tablets, and smartphones. See logical device Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

PPWN: As used in this disclosure, the PPWN is an acronym for a publically provided wireless network. The PPWN refers to a commercially provided and publicly available cellular wireless network.

Pull-Up Resistor: As used in this disclosure, a pull-up resistor is an electrical resistor that is used to: 1) limit the current flow through a switching device; and, 2) to control the voltage level presented across a switch, a load resistor, or a pull-down resistor.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Rigid Structure: As used in this disclosure, a rigid structure is a solid structure formed from an inelastic material that resists changes in shape. A rigid structure will permanently deform as it fails under a force.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services which is abbreviated as MMS.

USB: As used in this disclosure, USB is an acronym for Universal Serial Bus which is an industry standard that defines the cables, the connectors, the communication protocols and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Wireless: As used in this disclosure, wireless is an adjective that is used to describe a communication channel between two devices that does not require the use of physical cabling.

Wrist: As used in this disclosure, the wrist refers to an eight bone structure within the human body that flexibly attaches the radial bone and the ulna bone to the metacarpal bones of the hand.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A location-monitoring bracelet comprises
a jewelry item and an alarm circuit;
wherein the jewelry item contains the alarm circuit;
wherein the location-monitoring bracelet is configured for use with a client;
wherein the location-monitoring bracelet is worn by the client;
wherein the location-monitoring bracelet is configured for use with an appropriate authority;
wherein the location-monitoring bracelet is biometrically attached to the client such that the location-monitoring bracelet is removed from the client by the appropriate authority;
wherein the alarm circuit comprises a logic module, a communication module, a GPS module, a latch release, a charging port, a diode, a biometric sensor, and an external power source;
wherein the external power source further comprises a charging plug;
wherein the logic module, the communication module, the GPS module, the latch release, the charging port, the diode, the biometric sensor, the external power source and the charging plug are electrically interconnected;
wherein the battery further comprises a first positive terminal and a first negative terminal;
wherein the external power source further comprises a second positive terminal and a second negative terminal.

2. The location-monitoring bracelet according to claim 1
wherein the appropriate authority further comprises a personal data device;
wherein the personal data device further comprises a commercially provided and publicly available cellular wireless network;
wherein the personal data device is a programmable electrical device that communicates with the alarm circuit through the commercially provided and publicly available cellular wireless network;
wherein the alarm circuit communicates the location of the client using SMS messages transmitted over a wireless communication link and through the commercially provided and publicly available cellular wireless network.

3. The location-monitoring bracelet according to claim 2 wherein the jewelry item is worn on the wrist of the client.

4. The location-monitoring bracelet according to claim 3
wherein the alarm circuit is an electric circuit;
wherein the alarm circuit communicates with a GPS such that the alarm circuit determines the GPS coordinates of the client;
wherein the alarm circuit monitors the jewelry item such that the alarm circuit will detect when the jewelry item is cut off of the client;
wherein the alarm circuit communicates over the wireless communication link with the commercially provided and publicly available cellular wireless network.

5. The location-monitoring bracelet according to claim 4
wherein the alarm circuit sends an SMS message to inform the appropriate authority of the GPS coordinates of the client;
wherein the alarm circuit sends an SMS message to inform the appropriate authority when the jewelry item has been cut off the client;
wherein the alarm circuit biometrically confirms the identity of the appropriate authority.

6. The location-monitoring bracelet according to claim 5
wherein the jewelry item comprises a housing, a wrist band, and a latching mechanism;
wherein the wrist band attaches to the housing;
wherein the latching mechanism attaches to the wrist band.

7. The location-monitoring bracelet according to claim 6
wherein the housing is a rigid structure;
wherein the housing contains the alarm circuit.

8. The location-monitoring bracelet according to claim 7
wherein the wrist band forms a loop;
wherein the wrist band is a flexible structure.

9. The location-monitoring bracelet according to claim 8
wherein the latching mechanism is a fastening device;

wherein the latching mechanism secures the wrist band to the wrist of the client.

10. The location-monitoring bracelet according to claim 9 wherein the latching mechanism is an electrically controlled lock;

wherein the latching mechanism is controlled by the alarm circuit.

11. The location-monitoring bracelet according to claim 10 wherein the alarm circuit implements biometric safeguards that ensure that only the appropriate authority can authorize the release of the latching mechanism.

12. The location-monitoring bracelet according to claim 11 wherein the logic module is a programmable electronic device;

wherein the communication module is a wireless electronic communication device;

wherein the communication module is controlled by the logic module;

wherein the communication module communicates SMS messages between the logic module and the appropriate authority over the wireless communication link and the commercially provided and publicly available cellular wireless network.

13. The location-monitoring bracelet according to claim 12 wherein the GPS module is an electrical device;

wherein the GPS module communicates with the GPS;

wherein the GPS module determines the GPS coordinates of the GPS module;

wherein the GPS module transfers the GPS coordinates to the logic module.

14. The location-monitoring bracelet according to claim 13 wherein the latch release forms the electrical control of the lock of the latching mechanism;

wherein the logic module electrically controls the operation of the latch release.

15. The location-monitoring bracelet according to claim 14 wherein the logic module sends a signal that releases the latch release after the logic module has biometrically confirmed the presence of the appropriate authority using the biometric sensor.

16. The location-monitoring bracelet according to claim 15 wherein a continuity sensor is an electrical circuit;

wherein the electric conductor of the continuity sensor is positioned along the surface of the wrist band such that the logic module detects a measurable voltage across the continuity sensor when the wrist band is cut.

17. The location-monitoring bracelet according to claim 16 wherein the battery is a rechargeable battery;

wherein the chemical energy stored within the rechargeable battery is renewed and restored through the charging port;

wherein the charging port is an electrical circuit that reverses the polarity of the rechargeable battery;

wherein the charging port attaches to an external power source using the charging plug;

wherein the charging port receives electrical energy from the external power source through the charging plug.

18. The location-monitoring bracelet according to claim 17 wherein the diode is an electrical device that allows current to flow in only one direction;

wherein the diode installs between the rechargeable battery and the charging port such that electricity will not flow from the first positive terminal of the rechargeable battery into the second positive terminal of the external power source.

19. The location-monitoring bracelet according to claim 18 wherein the biometric sensor registers the fingerprint of the appropriate authority;

wherein the biometric sensor stores the registered fingerprint of the appropriate authority;

wherein the biometric sensor scans a fingerprint during the logic module activates the latch release;

wherein the biometric sensor compares the scanned fingerprint to the registered fingerprint of the appropriate authority;

wherein the biometric sends a signal to the logic module verifying the fingerprint match.

* * * * *